US012807183B2

(12) United States Patent
Ainampudi et al.

(10) Patent No.: US 12,807,183 B2
(45) Date of Patent: Nov. 24, 2026

(54) LANE ENDING COST

(71) Applicant: Zoox, Inc., Foster City, CA (US)

(72) Inventors: Parthasarathi Ainampudi, Sunnyvale, CA (US); Jack Riley, San Francisco, CA (US); Olivier Amaury Toupet, Escondido, CA (US)

(73) Assignee: Zoox, Inc., Foster City, CA (US)

( * ) Notice: Subject to any disclaimer, the term of this patent is extended or adjusted under 35 U.S.C. 154(b) by 411 days.

(21) Appl. No.: 18/375,033

(22) Filed: Sep. 29, 2023

(65) Prior Publication Data

US 2025/0108835 A1 Apr. 3, 2025

(51) Int. Cl.

| | |
|---|---|
| ***B60W 60/00*** | (2020.01) |
| ***B60W 30/16*** | (2020.01) |
| ***B60W 30/18*** | (2012.01) |
| ***B60W 40/04*** | (2006.01) |

(52) U.S. Cl.

CPC ........ *B60W 60/0015* (2020.02); *B60W 30/16* (2013.01); *B60W 30/18163* (2013.01); *B60W 40/04* (2013.01); *B60W 2552/53* (2020.02); *B60W 2554/406* (2020.02); *B60W 2554/80* (2020.02)

(58) Field of Classification Search

CPC ............. B60W 60/0015; B60W 30/16; B60W 30/18163; B60W 40/04; B60W 2552/53; B60W 2554/406; B60W 2554/80; B60W 60/0011; G05D 1/00; G08G 1/00; G01C 21/00

See application file for complete search history.

(56) References Cited

U.S. PATENT DOCUMENTS

| | | | | |
|---|---|---|---|---|
| 6,542,815 | B1 * | 4/2003 | Ishizaki | G01C 21/3461 340/990 |
| 12,296,847 | B1 * | 5/2025 | Choi | B60W 30/18163 |
| 12,415,541 | B1 * | 9/2025 | Jin | B60W 30/18163 |
| 12,479,477 | B2 * | 11/2025 | Shoemaker | B60W 30/18163 |
| 2008/0033643 | A1 * | 2/2008 | Shimizu | G01C 21/3461 701/533 |

(Continued)

FOREIGN PATENT DOCUMENTS

| | | | | |
|---|---|---|---|---|
| CN | 110979330 A | | 4/2020 | |
| JP | 2019219189 A | * | 12/2019 | B60W 60/0011 |
| WO | WO2022186003 A1 | | 9/2022 | |

OTHER PUBLICATIONS

JP-2019219189-A machien translation (Year: 2019).*

Search Report for International Application No. PCT/US2024/046759, Dated Dec. 19, 2024, 12 pages.

*Primary Examiner* — Angelina M Shudy

(74) *Attorney, Agent, or Firm* — Lee & Hayes, P.C.

(57) ABSTRACT

Techniques for generating lane ending costs for determining costs for vehicle positions in an environment are described herein. A planning component within a vehicle may determine, a lane ending of a lane of a route, the lane ending indicative of whether a vehicle is able to continue along the lane to a desired endpoint of the route. The planning component may determine, based at least in part on the lane ending, a lane ending cost and determine a cost for a candidate trajectory based at least in part on the lane ending cost. The planning component may then determine a control trajectory for an autonomous vehicle, based at least in part on the cost for the candidate trajectory.

18 Claims, 6 Drawing Sheets

(56) References Cited

U.S. PATENT DOCUMENTS

2009/0005971 A1* 1/2009 Otsuki ............... G01C 21/3859 701/532
2009/0210151 A1* 8/2009 Toyoda .............. G08G 1/09685 701/532
2010/0268452 A1* 10/2010 Kindo ................ G01C 21/3658 345/632
2013/0035858 A1* 2/2013 Sumizawa ......... G01C 21/3658 701/533
2016/0018229 A1* 1/2016 Lee ..................... B60W 40/072 701/409
2017/0082452 A1* 3/2017 Sumizawa .......... B60W 60/001
2017/0227966 A1* 8/2017 Monzen ............. B62D 15/0255
2018/0099676 A1* 4/2018 Goto ..................... B60W 30/10
2018/0143643 A1* 5/2018 Fairfield ............ G01C 21/3667
2018/0148051 A1* 5/2018 Lujan .............. B60W 30/18154
2018/0345963 A1* 12/2018 Maura ................ B60W 60/0011
2019/0171206 A1* 6/2019 Abrams ................. G01C 21/34
2020/0003572 A1* 1/2020 Masuda ................. G09B 29/10
2020/0182633 A1* 6/2020 Liu ........................ B60K 35/28
2020/0232806 A1* 7/2020 Goldman ............... G08G 1/167
2021/0061282 A1* 3/2021 Jafari Tafti .......... G05D 1/0088
2021/0080955 A1* 3/2021 Wilkinson ......... B60W 60/0011
2021/0094566 A1* 4/2021 Pietruska ........... G01C 21/3889
2021/0122374 A1* 4/2021 Da Silva .............. G06V 20/588
2021/0394786 A1* 12/2021 Zhu .................... B60W 60/0011
2021/0403028 A1* 12/2021 Kashu ........................ G06T 7/73
2022/0026224 A1* 1/2022 Zhao .................. B60W 60/0011
2022/0089164 A1* 3/2022 Wang .............. B60W 30/18163
2022/0116511 A1* 4/2022 Speasl ................ H04N 1/32128
2022/0135039 A1* 5/2022 Jardine ........... B60W 30/18163 701/26
2022/0185326 A1* 6/2022 Isele ................. B60W 60/0015
2022/0185334 A1* 6/2022 Bae ...................... G08G 1/0145
2022/0214181 A1 7/2022 Jafari Tafti et al.
2022/0324489 A1* 10/2022 Fedorov .......... B60W 30/18163
2023/0091276 A1* 3/2023 Rajab .............. B60W 30/18163 701/1
2023/0123418 A1* 4/2023 Kolbe ................. B60W 60/001 701/25
2023/0150508 A1* 5/2023 Nimura ........... B60W 30/18163 701/41
2023/0303119 A1 9/2023 Mark et al.
2023/0311940 A1* 10/2023 Kato .................. B62D 15/0255
2024/0067214 A1* 2/2024 Nagasaka .......... G01C 21/3691
2024/0174227 A1* 5/2024 Nimura .................. G08G 1/167
2025/0002021 A1* 1/2025 Fayad ................ B60W 60/0011
2025/0058780 A1* 2/2025 Shoemaker ..... B60W 30/18163
2025/0123109 A1* 4/2025 Fayad .................... G08G 1/167
2025/0276714 A1* 9/2025 Ainampudi ......... B60W 60/001
2025/0313207 A1* 10/2025 Zeiynali Farid ..... G08G 1/0125
2026/0116426 A1* 4/2026 Jin ..................... B60W 60/0011

* cited by examiner

400

LANE ENDING COST

BACKGROUND

Vehicles are increasingly supplementing or replacing manual functionality with automatic controls. Autonomous driving functionality, such as trajectory planning and vehicle navigation, may benefit from on-board computing systems capable of making split-second decisions to respond to myriad events and scenarios, including determining trajectories through environments and reactions of the vehicle to dynamic objects and events in the environment.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
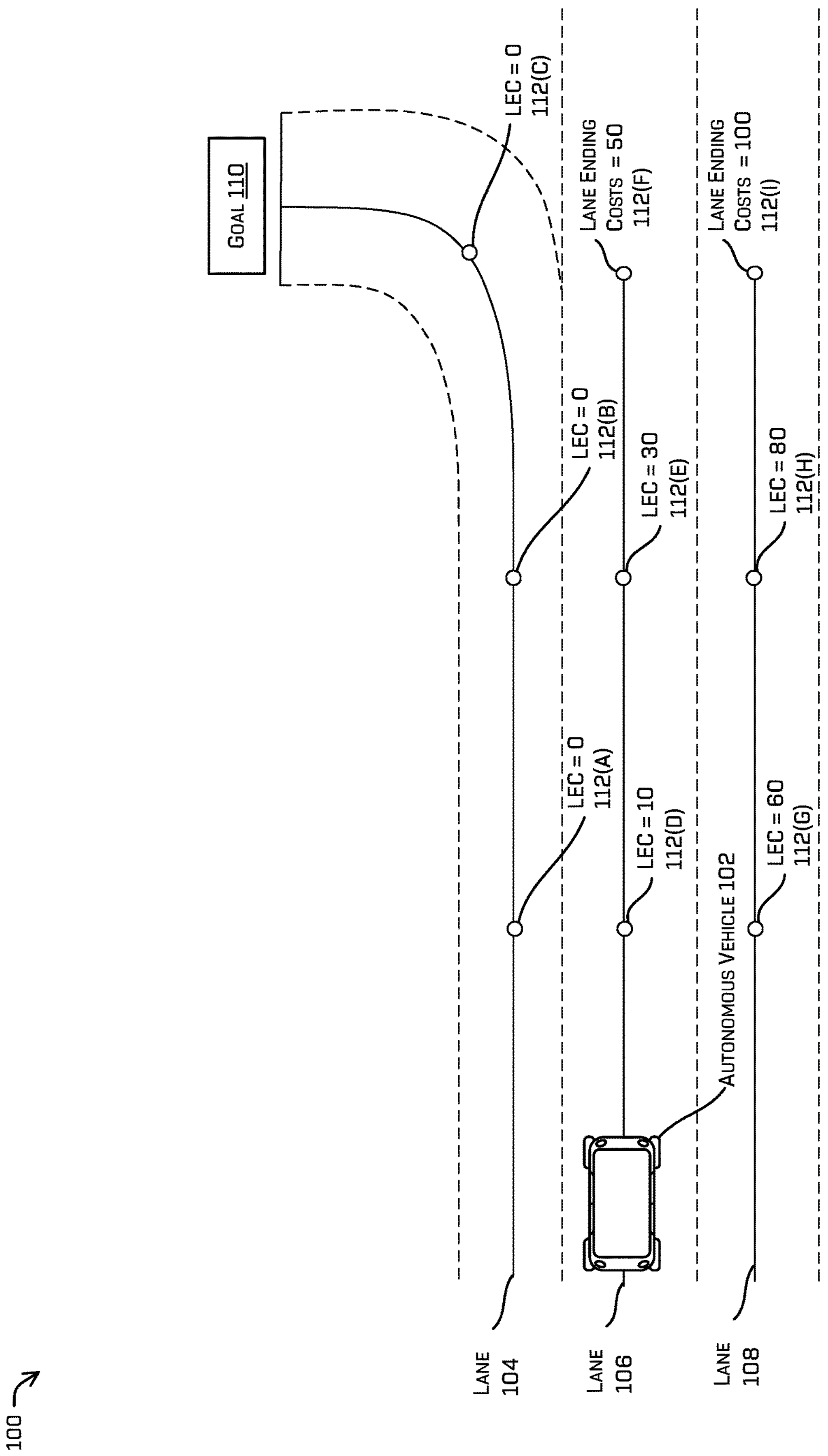
FIG. 1 illustrates an example environment for which an example lane ending cost is generated for a vehicle in the environment, in accordance with one or more examples of the disclosure.

This application describes techniques for generating and utilizing lane ending costs (e.g., a cost which may be associated with a portion of a lane associated with a penalty for arriving at that portion at the end of a fixed horizon of search) to, for example, determine control trajectories for a vehicle to follow. The lane ending cost techniques described herein may be utilized for determining costs (e.g., values used to inform driving behavior) that are based on information about a vehicle's route and/or the presence of other vehicles, which may include maps, route references, perception data and so on. More particularly, a lane may be considered to end when it physically ends and/or when it becomes no longer possible to continue toward an intended destination from a particular lane. A lane ending cost may be used to inform driving behavior regarding lane changes due to the ending of lanes along a route to a destination. For example, the lane ending cost may be a cost which increases as an amount of time before the current lane ends decreases based on the vehicle's route. Further, the lane ending cost may be a cost which increases based on a number of lanes between a current lane and a lane which is not ending (e.g., not ending at a current junction or intersection). A lane ending within a route may be a point at which the lane is no longer part of the route and before which the vehicle should change lanes to a non-ending (or continuing) lane to continue following the route. As used herein, a lane ending may include a lane merging into an adjacent lane, a lane diverging from a route of the vehicle, a lane changing to a restricted use lane along the route of the vehicle, a physical ending of a lane, a lane being determined to be ended due to circumstances (e.g., due to an emergency pullover), a position along a lane in which a vehicle is unable to continue along to a desired endpoint (e.g., based on kinematic and/or dynamic constraints, policy constraints such as crossing multiple lanes of traffic, or otherwise) and/or any other situation in which a lane may stop being usable by the vehicle to follow the route to the destination.

In some examples, a lane ending cost techniques may include progress references (e.g., locations along one or more lane references and/or particular lines or geometric features associated with a lane(s)) which may represent or be used to calculate lane ending costs or lane ending penalties for a portion of a driving lane associated with the location. For example, a progress reference may be assigned a lane ending cost for a location in a driving lane associated with the progress reference. The lane ending costs for locations between progress references may be determined at least in part by interpolating between progress references before and after the location in the driving lane.

In some examples, the lane ending cost may be determined based on the presence of objects or agents in the driving lane and/or adjacent lanes (e.g., a lane that may not currently be ending or a lane between a current lane and the lane that is not ending). For example, a lane end of a lane may be shifted toward the vehicle along the vehicle's route to a location prior to the objects or agents in the adjacent lanes (e.g., parked vehicles, construction cones, etc.) that may prevent the vehicle from changing lanes to a lane which is not ending.

In addition or alternatively, the lane ending cost may be determined based on a lane change uncertainty which may represent an estimated difficulty for the vehicle to change lanes to a non-ending lane. In some examples, the lane ending cost progress references may be shifted toward the vehicle along the vehicle's route such that lane ending costs may begin or become non-zero earlier in the vehicle route and/or the existing costs may be increased.

The planning component may then utilize the lane ending cost(s) to determine costs for positions in the environment associated with the route. For example, the planning component may determine a cost associated with a position in a route. The planning component may also determine other costs for the position such as a cost associated with the position and lane markers, a cost associated with a driving speed and other adherence with policies and laws, safety costs (such as may be based on proximity to objects and/or predicted proximities), whether the vehicle is progressing toward a goal, and so on. Based on these costs, the planning component may then determine a combined cost for the position in the environment.

In some instances, the planning component may utilize the lane ending cost of a position to determine and output a control trajectory. For example, the position may be part of a candidate trajectory for the vehicle and the combined cost may be used, at least partly, to determine a cost for the candidate trajectory. In some examples, a planning component may be integrated within a vehicle (such as an autonomous vehicle) and may receive and/or encode various types of data (e.g., vehicle state data, object features, road features, etc.). The planning component can provide the various types of data as input to one or more machine-learning models (hereinafter "ML models"). In some examples, the ML model(s) may be trained to output one or more candidate trajectories for the vehicle to follow. In such cases, the vehicle may determine a control trajectory based on the costs of the one or more candidate trajectories. The vehicle may follow the control trajectory while operating within the environment.

As discussed throughout this disclosure, the techniques described herein may improve vehicle safety and/or driving efficiency by determining improved driving trajectories through the environment by using the lane ending cost techniques when determining a control trajectory for the vehicle to follow. In some examples, the techniques described herein may improve safety and efficiency by better accounting for lane endings and/or other objects or agents near the lane endings in cost determinations, thereby improving the ability of the vehicle to change lanes smoothly while reducing the occurrence of the vehicle failing to change lanes in time to continue following a non-ending lane and/or the occurrence of corrective maneuvers (e.g., maneuvers that require significant departure in speed from that of surrounding vehicles to avoid having to reroute after missing a lane change prior to a junction).

The techniques described herein can be implemented in a number of ways. Example implementations are provided below with reference to the following figures. Example implementations are discussed below in which the vehicles are implemented as autonomous vehicles. However, the methods, apparatuses, and systems described herein can be applied to fully or partially autonomous vehicles, robots, and/or robotic systems and are not limited to autonomous vehicles. Moreover, at least some of the techniques described herein may be utilized with driver-controlled vehicles. Also, while examples are given with respect to land vehicles (e.g., cars, vans, trucks, or other wheeled or tracked vehicles), the techniques can also be utilized in aviation or nautical contexts. Additionally, the techniques described herein may be used with real data (e.g., captured using sensor(s)), simulated data (e.g., generated by a simulator), or any combination of the two.

FIG. 1 illustrates an example environment for which example lane ending costs are generated for a vehicle following a route in the environment. As illustrated in FIG. 1, the environment 100 includes an autonomous vehicle 102 driving along a route through a road junction. The vehicle 102 is positioned along the route where the route may include lanes 104, 106 and 108, with the vehicle currently driving in lane 106 toward a goal 110. As illustrated, lane 106 and lane 108 have lane endings at a junction at which the route may continue in lane 104 toward the goal 110 (e.g., a desired endpoint—which may be an intermediate location along a desired route in accordance with a finite time horizon planning scheme). In some examples, lane endings may be determined or established by the vehicle 102 during route planning or navigating, the lane endings may be determined or established ahead of time and stored in map data, or some other variation or combination thereof.

FIG. 1 further includes lane ending costs 112(A)-112(C) for progress references along the lane 104, lane ending costs 112(D)-112(F) for progress references along the lane 106 and lane ending costs 112(G)-112(I) for progress references along the lane 108. Progress references may be points along lanes of the route at which information about the lanes may be specified. Progress references may be determined or established by the vehicle 102 during route planning or navigating, the progress references may be determined or established ahead of time and stored in map data, or some other variation or combination thereof. Further, progress references may be located at fixed or variable intervals along lanes of the route (either temporally or spatially).

In the illustrated example portion of the route of vehicle 102 toward the goal 110, lane 104 does not include a lane ending. As such, the lane ending costs 112(A), 112(B) and 112(C) may be zero (0) for the illustrated example portion of the route. While the lane ending costs 112(A)-112(C) of the lane 104 are zero in the illustrated example portion of the route, it will be understood that if the route continues to a further junction, the route may include a lane ending for lane 104. The portion of the route proximate the lane ending for lane 104 may include lane ending costs that are non-zero.

As mentioned above, in the illustrated example a portion of the route of vehicle 102 toward the goal 110 (desired endpoint), lanes 106 and 108 include lane endings as the route follows lane 104 after lane 104 diverges from lanes 106 and 108. Accordingly, the lane ending costs 112(D)-112(I) may be determined to increase the cost of remaining in lanes 106 and 108 as the vehicle 102 approaches the lane endings. Further, the lane ending costs 112(D)-112(I) may be determined so as to be monotonically increasing with regard to approaching the lane endings and as to the number of lanes the vehicle is away from a lane without an ending. As shown, the values of the lane ending costs 112(G)-112(I) may be higher than the lane ending costs 112(D)-112(F) because lane 108 is further from lane 104 than lane 106. In addition, the lane ending costs located closer to the lane endings, such as lane ending costs 112(F) and 112(I), may be greater than lane ending costs in the same lane further from the lane endings such as lane ending costs 112(D) and 112(G).

While shown with particular values, the magnitude, range and growth of the lane ending costs may vary depending on the example. Further, though not shown for ease of illustration and explanation, lane ending costs may be determined for both left and right lane endings. For example, if autonomous vehicle 102 were traveling in lane 104 along a route that continued in lanes 106 and 108 after the junction, the lane ending costs 112(A) and 112(C) may be determined to be negative or otherwise include a label to indicate a lane change to the right.

Though not shown for ease of illustration and understanding, some examples may include lane ending costs which may include non-zero values for lanes through multiple junctions. For example, a route may include a first junction in which a left lane and a middle lane may continue and a right lane may end. The route may then continue through a second junction in which the left lane ends. In such an example, the lane end cost of the left lane (e.g., resulting from the lane ending at the second junction) may be non-zero for a vehicle position prior to the first junction (e.g., a non-zero value which may be larger than the zero or non-zero value of the middle lane at that vehicle position). In this way, the lane ending cost may bias the trajectory determination prior to the first junction to change to the middle lane which will continue through both the first and second junctions. Of course, examples are not limited to two junctions and the distance prior to the lane ending at which a lane ending cost may come nonzero may vary based on the implementation and/or other considerations.

Additional detail of an example process for determining the values for the lane ending costs 112(A)-112(I) for the progress references along lanes 104-108 is discussed below with regard to FIG. 3.

As discussed above, a planning component may utilize the lane ending costs to determine costs for positions in the environment associated with the driving lanes 104-108. For example, the planning component may determine a closest lane 104-108 to the vehicle position (e.g., based on a distance to a lane center). The planning component may then interpolate the lane ending costs of the progress references before and after the location of the vehicle 102 in the driving lane to determine a lane ending cost for the vehicle's position. The distances utilized in determining costs may be measured from a center of the vehicle 102, from various points on the vehicle 102, or a disk or region centered around the vehicle 102 or a point on the vehicle 102. The planning component may also determine other costs for the vehicle position such as a cost associated with the position and lane markers, a cost associated with a driving speed and so on. Based on the costs including the lane ending cost, the planning component may then determine a combined cost for the vehicle position in the environment. In some examples, the combined cost may be utilized in determining a cost for a trajectory for the vehicle to follow which includes the vehicle position. In addition or alternatively, the individual costs for the vehicle position may be used to determine a cost for a trajectory for the vehicle to follow which includes the vehicle position. Additional details for how such a tree may be created based on various costs and used in selecting a trajectory may be found in the U.S. patent application Ser. No. 17/394,334 entitled "Vehicle Trajectory Control Using a Tree Search" filed on Aug. 4, 2021, the entire contents of which are hereby incorporated by reference.

Figure 2:
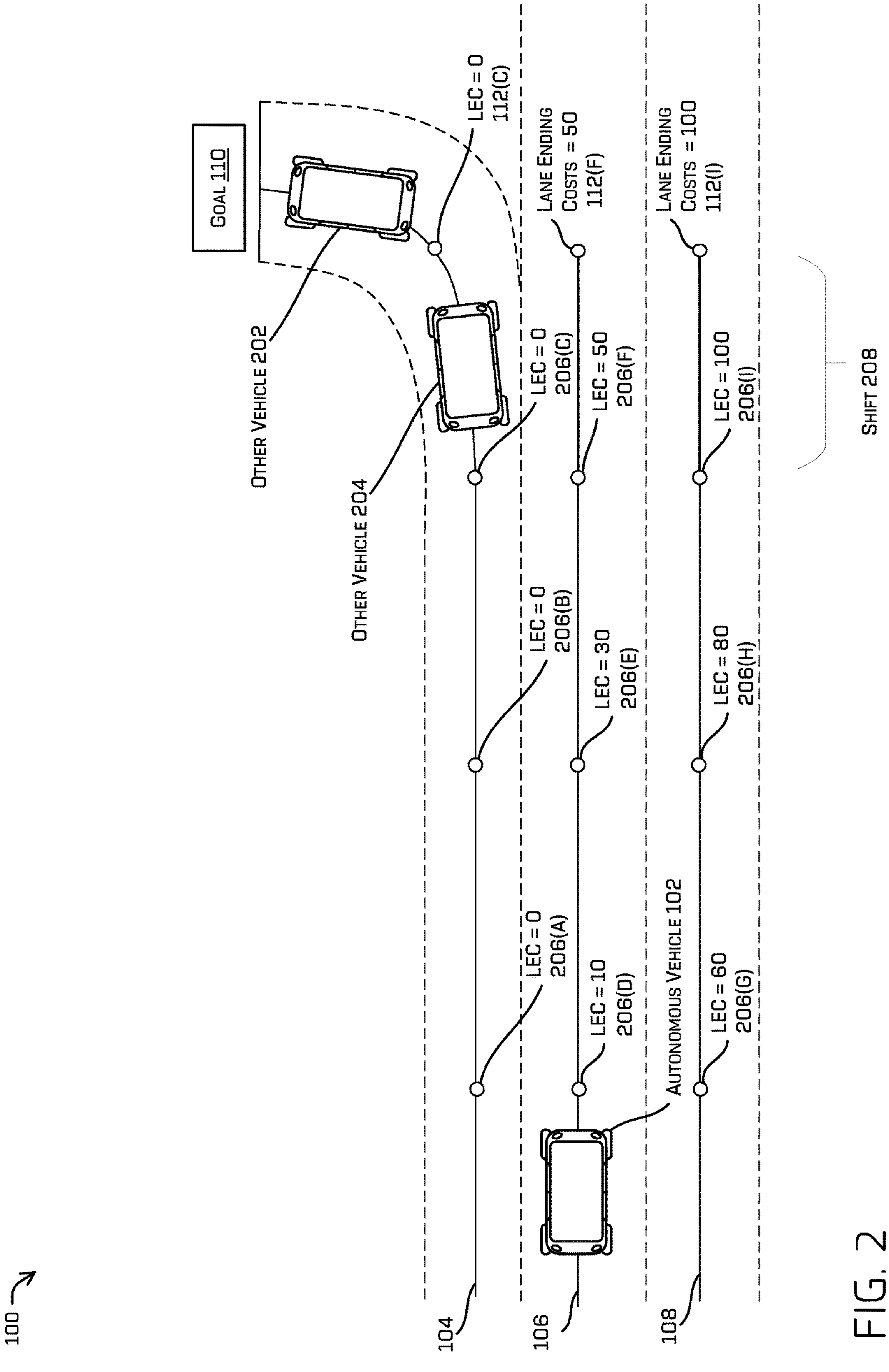
FIG. 2 illustrates an example environment for which an example lane ending cost is generated for a vehicle in the environment, in accordance with one or more examples of the disclosure.

FIG. 2 illustrates an example environment 200 for which example lane ending costs are generated for a vehicle following a route in the environment. More particularly, FIG. 2 illustrates an example in which the lane ending costs of FIG. 1 may be adjusted based on traffic information. As illustrated in FIG. 2, the environment 200 includes the autonomous vehicle 102 driving along the route through the road junction as discussed above with regard to FIG. 1. In addition, the environment 200 includes two other vehicles 202 and 204 that may be occupying a portion of the lane 104 in proximity to the lane endings of lanes 106 and 108. In the example illustrated in FIG. 2, the lane ending cost determination may adjust the lane ending costs based on the occupancy of lane 104.

More particularly, the planning component may determine that the vehicle 102 is approaching a lane ending (e.g., the sensors of the vehicle can detect objects in proximate the lane endings). The planning component may then determine whether vehicles or other objects are present in a non-ending lane the vehicle 102 is to change to or in a lane between a current lane of the vehicle 102 and the non-ending lane. If so, the planning component may determine whether to adjust the lane endings. As discussed in more detail below, an adjustment to the lane endings may be based on a lane end position offset and or a lane change success uncertainty value.

The planning component may determine whether vehicle queue(s) are present in the non-ending lane or a lane the vehicle 102 will cross to reach the non-ending lane. For example, though not shown in FIG. 2, in an example in which vehicle 102 is driving in lane 108, a vehicle queue may exist in one or both of lanes 104 and 106.

The planning component may determine the detected vehicles form a queue based on one or more of the vehicles' velocity being below a threshold velocity, the queue is near the lane ending position of a lane (i.e., the distance from the lane ending position to the first vehicle in the queue must be less than a threshold) and/or any gaps between the vehicles in the queue are below a threshold length.

If the vehicles form a queue, the planning component may determine a length of the queue. For example, the length of a queue may be the distance between the lane ending position and the rear end of the last vehicle in the queue.

The planning component may then determine a lane ending position offset based on the length of the queue or the length of the queues where there are more than one queue. In some examples, the lane ending position offset may be determined to be equal to the longest length of queue (e.g., the length of the queue which is closest to the vehicle 102).

Some examples may utilize the lane ending position offset to shift the position where the lanes are considered to end (e.g., to represent the fact that vehicle 102 is to change lanes prior to the queued vehicles). While the example illustrated in FIG. 2 includes the shift 208 being applied to lanes 106 and 108, other examples may include lane specific shifts which may include different lane ending positions. In various examples, such a shift may comprise modifying the position of where a lane ends for determining associated lane ending costs. In at least some such examples, such as the example illustrated in FIG. 2, the original progress references may not be altered (e.g., in location) but a lane ending cost may be applied at various earlier positions (such as in 206(*f*) and 206(*i*)) such that the maximum lane ending cost is determined from the shift location through the lane ending as determined. In additional or alternative examples, the lane ending may be modified based on the determination and the associated costs may be recomputed.

Some examples may further include the planning component determining a lane change uncertainty modifier which may increase the shift applied to the lanes 106 and 108 or apply a shift in absence of a detected queue. In some examples, the lane change uncertainty modifier may represent or be used to account for a level of difficulty in making lane changes based on the current traffic condition. For example, a lane changes may be more difficult when other vehicles are moving in an adjacent lane and will likely be more difficult as the lane change becomes more urgent (e.g., as the vehicle 102 approaches the lane ending). In some examples, the lane change uncertainty modifier may be determined based on simplified implementation that is based on the relative distance between adjacent vehicles and the vehicle 102, as well as the relative velocity of the other vehicles and or vehicle 102 with respect to the speed limit of the road.

Some examples may determine a lane change uncertainty modifier for each lane the vehicle 102 will cross to reach a non-ending lane and select the maximum lane change uncertainty modifier. For example, the planning component may determine a lane change uncertainty modifier for a particular lane based on the status of the vehicles in that lane (e.g., all detected vehicles in the lane, vehicles within a threshold distance of the vehicle 102 and/or a threshold distance of the lane ending). Some examples may utilize the following to calculate the overall lane change uncertainty modifier as a value between 0 and 1:

$$u = \max_{id \in adjacent\ lanes}\left(\left|\sum_{i}^{N}\gamma\cdot\Delta_s\cdot\Delta_v\right|\right)$$

where N is the number of vehicles, $\Delta_s$ is the normalized relative distance from the other vehicle i (e.g., 202-204) to the vehicle 102, and $\Delta_v$ is the normalized relative speed of vehicle i with respect to the road's speed limit and $\gamma$ is a tuning parameter that may have a value between 0 and 1. In some examples, the lane change uncertainty modifier may increase as the distance between the vehicle 102 and the other vehicles (e.g., 202-204) decreases and increase as the velocities of the vehicles increases and/or is closer to the speed limit of the road.

Of course, some examples may consider objects other than vehicles in performing the operations discussed above. Further, examples are not limited to the calculations included above. For example, some examples may consider additional factors, such as the predicted trajectories of adjacent vehicles. Furthermore, some examples may utilize machine learning models in addition to or as an alternative to a heuristic-based determination.

Some examples may utilize the lane ending offset and lane change uncertainty modifier to determine a shift 208 to apply to the adjusted the location(s) one or more lanes are considered to end. For example, the planning component may generate a virtual lane ending position s' based on an original lane ending position s and the lane ending offset d, so that the virtual lane ending position is shifted closer to the vehicle 102 to a position directly behind the longest queue of vehicles (if there is any). The planning component may then modify the virtual lane ending position from the position s' to a position s" to account for the lane change uncertainty modifier u. In some examples, the planning component may utilize linear interpolation between position s' and the position of the vehicle 102 based on the value of the lane change uncertainty modifier u. In such an example, for a lane change uncertainty modifier u close to 1, the lane ending position is moved closer to the vehicle 102.

The planning component may then replace the original lane ending position s with the virtual lane ending position s" in the calculation of lane ending cost and re-populate or otherwise update the lane ending cost values.

Having determined the modified lane ending costs 206(A)-206(I) based on the shift 208, the planning component may continue as discussed above to determine cost(s) for position(s) of the vehicle in the lanes 104-108 and/or determine cost(s) for a trajectory for the vehicle 102 to follow which includes the vehicle position. While shown as having the same costs as lane ending costs 112 (e.g., but shifted toward the vehicle 102), in some examples, the costs may be more or less than the unshifted costs.

Many variations and modifications may be made to the above-described examples. For example, in some variations, other modifications or adjustments to the lane ending costs may be included in or used as alternatives to the operations discussed above.

For example, in some variations, on the fly adjustments to lane ending costs may be made to account for other conditions such as the presence of a construction zone or a disabled vehicle. For example, a disabled vehicle may be present in the lane 104 of FIG. 2 between modified lane ending costs 206(A) and 206(B). Some examples may include the planner component identifying the disabled vehicle and modifying the lane ending costs in lane 106 prior to the disabled vehicle to be zero (e.g. equal to the lane ending costs of lane 104. In this way, the influence of the lane ending costs to bias the vehicle 102 to move into the lane 104 may be removed from the trajectory determination until after the disabled vehicle has been passed. Similar lane ending cost modification variations may be applied for construction zones, other obstacles or the like.

Further, in some variations, the planner component may utilize one or more of a heuristic-based traffic condition analyzer, a machine learning-based traffic congestion detection module (e.g., in a prediction component that may provide a signal indicating the severity of traffic congestion, a data-driven module that may assess the difficulty of lane change in different locations, and/or a fuser that may combine the outputs of these modules for use in determine a lane ending cost.

Processes 300 and 400 are illustrated as collections of blocks in a logical flow diagram, representing sequences of operations, some or all of which can be implemented in hardware, software, or a combination thereof. In the context of software, the blocks represent computer-executable instructions stored on one or more computer-readable media that, when executed by one or more processors, perform the recited operations. Generally, computer-executable instructions include routines, programs, objects, components, encryption, deciphering, compressing, recording, data structures, and the like that perform particular functions or implement particular abstract data types. The order in which the operations are described should not be construed as a limitation. Any number of the described blocks can be combined in any order and/or in parallel to implement the processes, or alternative processes, and not all of the blocks need to be executed in all examples. For discussion purposes, the processes herein are described in reference to the frameworks, architectures and environments described in the examples herein, although the processes may be implemented in a wide variety of other frameworks, architectures or environments.

Figure 3:
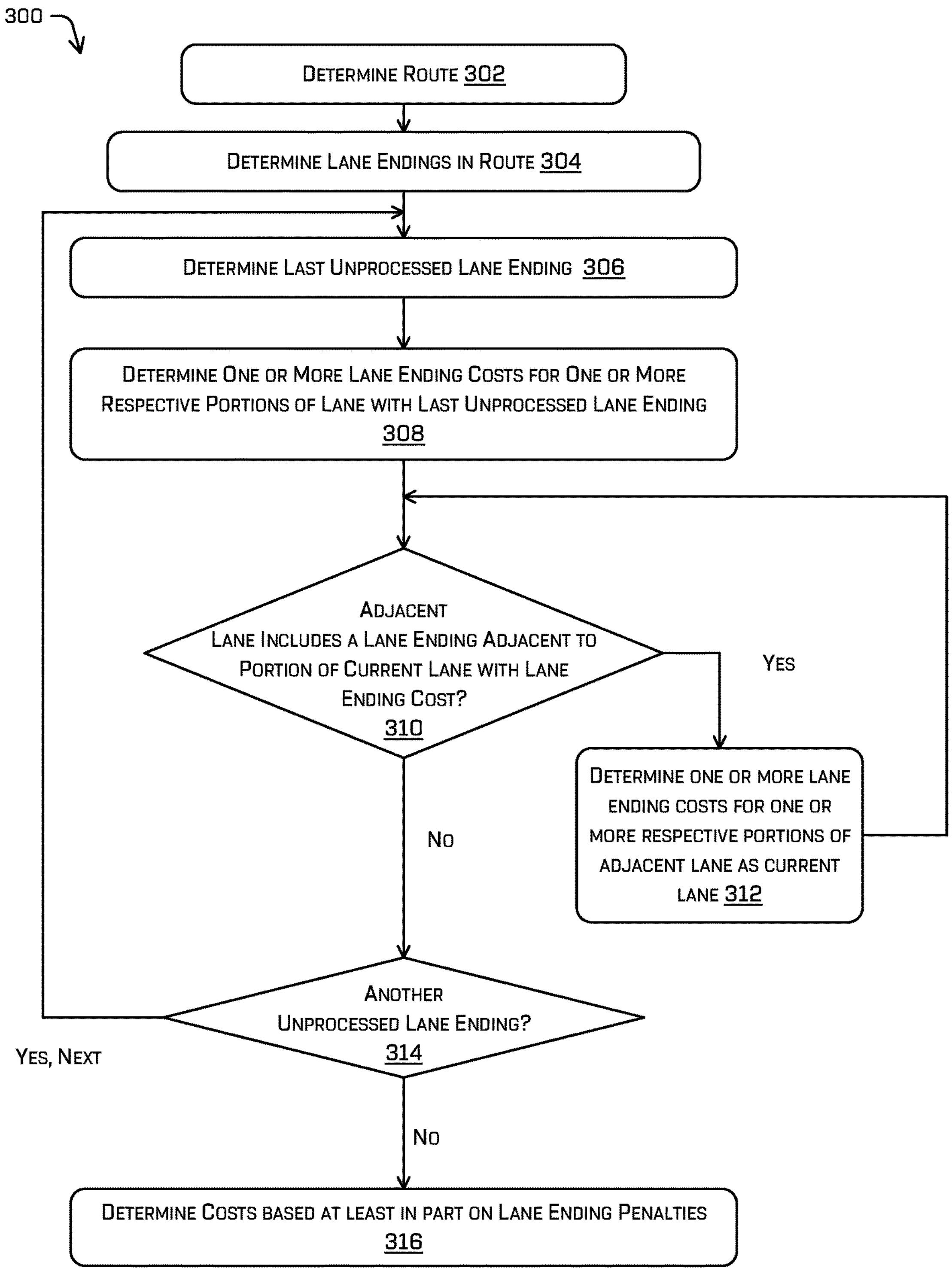
FIG. 3 is a flow diagram illustrating an example process for determining an example lane ending cost, in accordance with one or more examples of the disclosure.

FIG. 3 is a flow diagram illustrating an example process 300 for controlling a vehicle to follow a route in an environment based at least in part on lane ending costs. Some or all of the operations in the example process 300 may be performed by a planning component integrated within a perception component, a prediction component, a planning component, and/or other components and systems within an autonomous vehicle. In some examples, the planning component may include various components, such as an encoder component, a machine-learning model component, and/or a tree structure component which may be configured to determine a control trajectory for the vehicle to follow based on costs including one or more lane ending costs.

At operation 302, the planning component may determine a trajectory or a portion of a trajectory of a vehicle in an environment. Operation 302 may be performed as discussed above with respect to FIGS. 1-2.

At operation 304, the planning component may determine one or more lane endings in the route of the vehicle. In some examples, the determination of lane endings may be performed for a portion of the route of the vehicle (e.g., within a horizon) or the entire route. Operation 304 may be performed as discussed above with respect to FIGS. 1 and 2. At operation 306, the planning component may determine a last unprocessed lane ending of the one or more determined lane endings in the route of the vehicle. In some examples, the last unprocessed lane ending may refer to the lane ending furthest away from the vehicle along the route and/or closest to the end of the route or of the portion of the route.

At operation 308, the planning component may determine one or more lane ending costs for one or more respective portions of the lane with the last unprocessed lane ending. As discussed above, in some examples, the lane ending costs may be determined for progress references along the lane and lane ending costs for particular locations along the lane may be determined through interpolation of the landing costs of the nearby progress references. Further, the values of the lane ending costs may vary from example to example.

As discussed above, lane ending costs for positions decrease as the distance to the lane ending increases.

At operation 310, the planning component may determine whether an adjacent lane included a lane ending that is adjacent to a portion of the current lane that has a nonzero lane ending cost. If so, the process may continue to 312. Otherwise, the process may continue to 314. In some examples, assigning of costs may be performed substantially simultaneously based at least in part on relative distances from a desired endpoint (which may be an intermediate endpoint to a final destination along a fixed time horizon).

At 312, the process may determine one or more lane ending costs for respective portions of the adjacent lane determined in 310. In some examples, lane ending costs for adjacent lanes (e.g., lane 108) determined at 310 may be determined as larger values than the lane ending costs of the lane closer to the non-ending lane (e.g., lane 106). As such, a minimum value assigned by some examples at 312 may be greater than a maximum value assigned at operation 308 or a previous iteration of operation 312 since the last iteration of operation 308. The process may then return to operation 310 using the adjacent lane as a next current lane.

At operation 314, the process may determine whether another unprocessed lane ending is present along the route. If so, the process may return to 308 for the next unprocessed lane ending. In some examples, the process may return a yes at 314 when a distance between lane endings along the route is sufficient that lane ending costs for lane endings further along the route have decayed to zero for all lanes. In this case, the process may continue to work backwards along the route to find an unprocessed lane ending closer to the vehicle. If all lane endings have been processed, the process may continue to 316.

At 316, the process may the determine costs for vehicle positions and or trajectories based at least in part on the lane ending costs. Operation 316 may be performed as discussed above with respect to FIGS. 1-2. In some examples, the costs may be used to evaluate or chose a control trajectory from among a set of candidate trajectories. In some examples, the vehicle 102 may be controlled based on the control trajectory chosen at 316.

Figure 4:
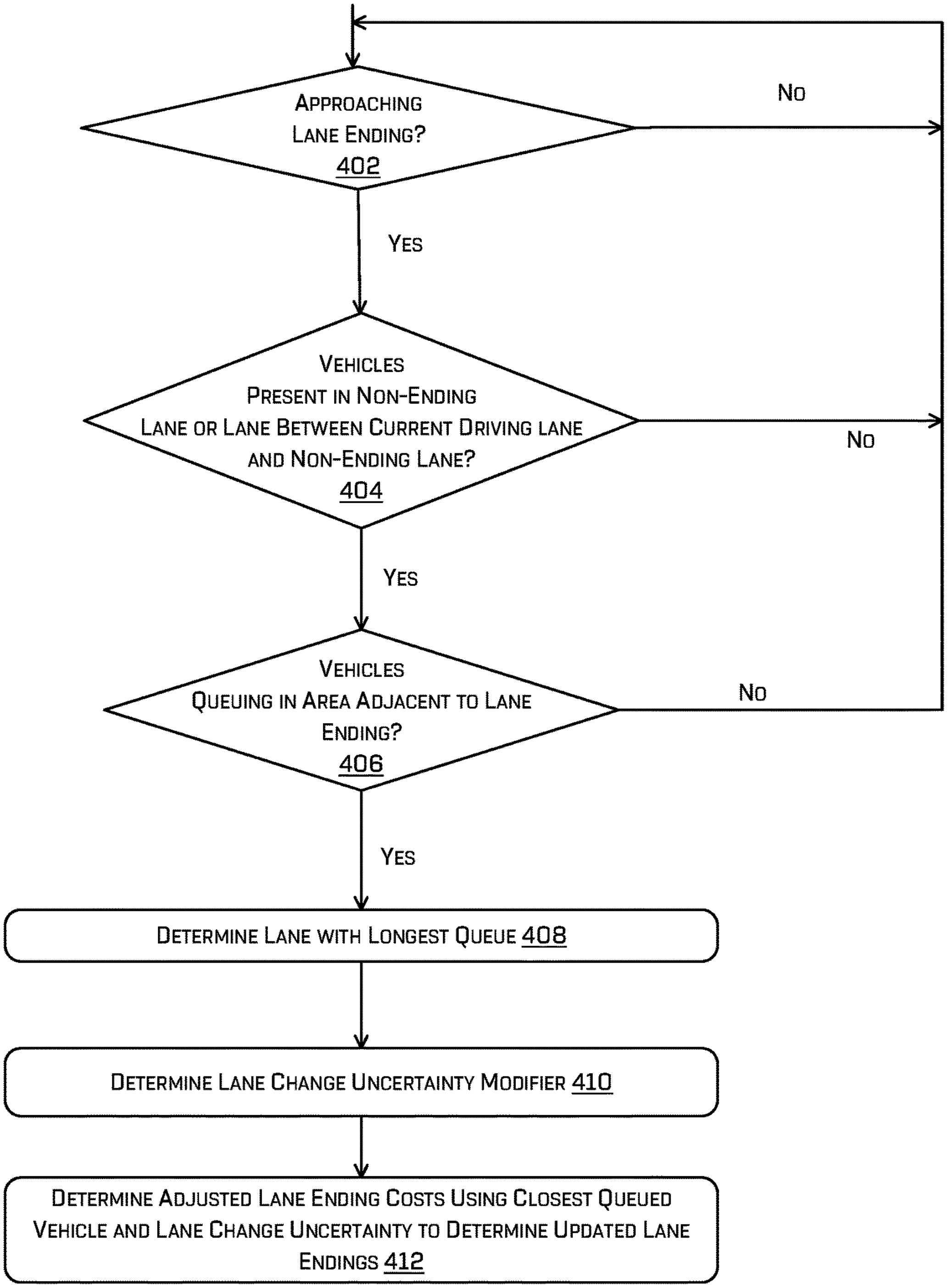
FIG. 4 is a flow diagram illustrating an example process for determining an example lane ending cost, in accordance with one or more examples of the disclosure.

FIG. 4 is a flow diagram illustrating an example process 400 for controlling a vehicle to follow a route in an environment based at least in part on lane ending costs. More particularly, FIG. 4 illustrates an example in which the lane ending costs of FIG. 1 may be adjusted based on traffic information.

Some or all of the operations in the example process 400 may be performed by a planning component integrated within a perception component, a prediction component, a planning component, and/or other components and systems within an autonomous vehicle. In some examples, the planning component may include various components, such as an encoder component, a machine-learning model component, and/or a tree structure component which may be configured to determine a control trajectory for the vehicle to follow based on costs determined based on the lane ending costs.

At operation 402, the planning component may determine if the vehicle is approaching a lane ending. If so, the process may continue to 404. Otherwise, the process may wait, for example, until a next tick, and repeat operation 402. Operation 402 may be performed as discussed above with respect to FIG. 2. At operation 404, the planning component may determine whether vehicles are present in a non-ending lane or a lane between a current ending driving lane and the non-ending lane. If so, the process may continue to 406. Otherwise the process may return to 402. Operation 404 may be performed as discussed above with respect to FIG. 2. At operation 406, the planning component may determine if the vehicle detected at 404 are forming a queue in an area adjacent to a lane ending. Operation 406 may be performed as discussed above with respect to FIG. 2.

At operation 408, the planning component may determine a lane which has the longest queue and/or the parameters of the queue(s). Operation 408 may be performed as discussed above with respect to FIG. 2. At operation 410, the planning component may determine a lane change uncertainty modifier. Operation 410 may be performed as discussed above with respect to FIG. 2.

At operation 412, the planning component may determine adjusted lane ending costs using closest queued vehicle and lane change uncertainty to determine lane end. Operation 412 may be performed as discussed above with respect to FIGS. 2 and 3.

Figure 5:
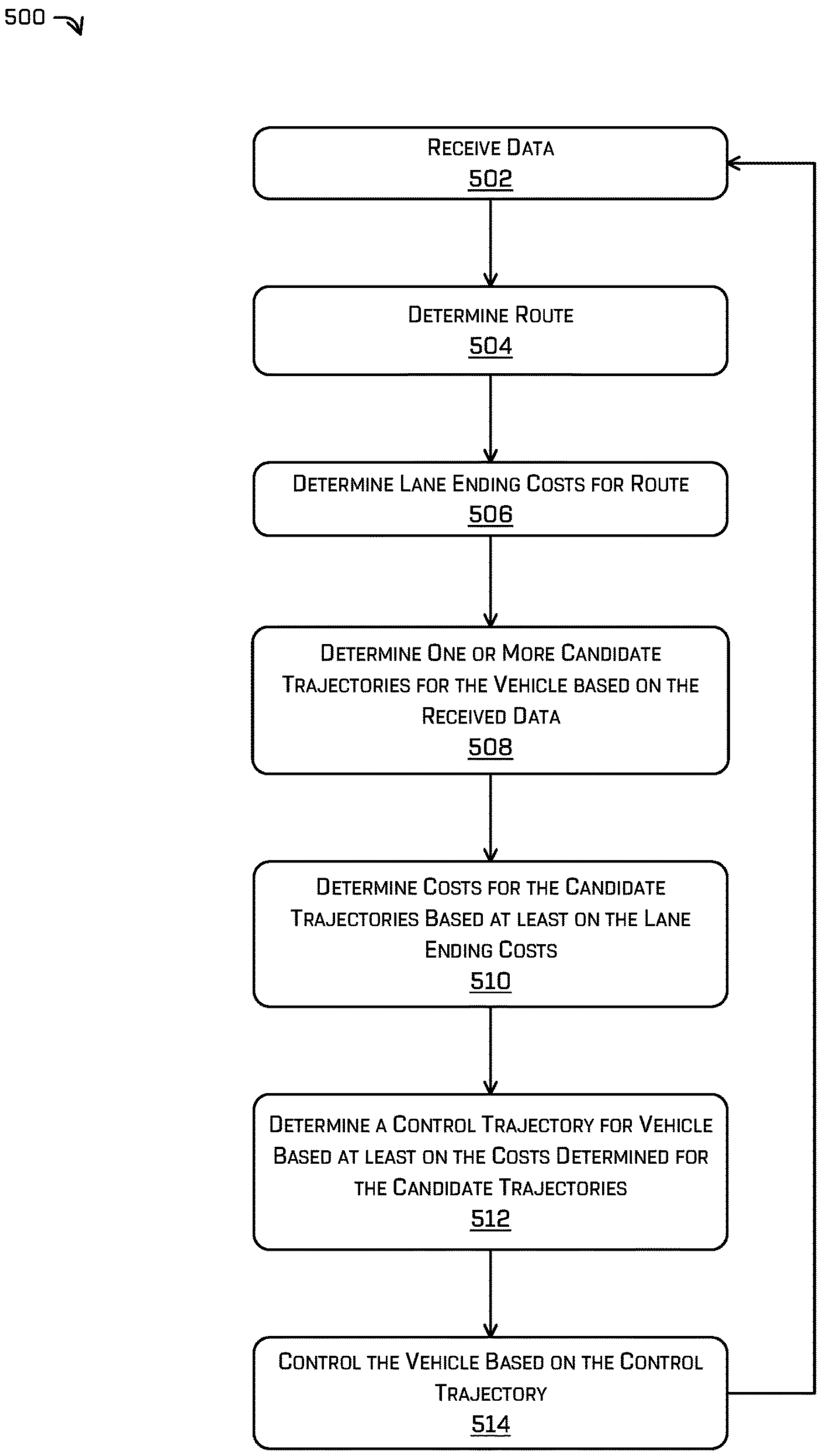
FIG. 5 is a flow diagram illustrating an example process for determining a control trajectory from candidate trajectories using lane ending costs.

FIG. 5 is a flow diagram illustrating an example process 500 for determining a control trajectory from candidate trajectories using lane ending costs. Some or all of the operations in the example process 500 may be performed by a planning component integrated within a perception component, a prediction component, a planning component, and/or other components and systems within an autonomous vehicle. In some examples, the planning component may include various components, such as an encoder component, a machine-learning model component, and/or a tree structure component which may be configured to determine a control trajectory for the vehicle to follow based on costs determined based at least in part on lane ending costs.

At 502, the planning component may receive data from various components of the vehicle. In some examples, the types of data may include vehicle mission data, state data, object data, road feature data, and/or any other type of data. At 504, the planning component may determine a route or portion of a route of the vehicle. At 504, the planning component may determine lane ending costs for the route or a portion of the route of the vehicle. Operations 502-506 may be performed as discussed above with respect to FIGS. 1-4.

At 506, the planning component may determine one or more candidate trajectories for the vehicle based on the received data and the route. Example techniques for encoding data can be found, for example, in U.S. application Ser. No. 17/855,088, filed Jun. 30, 2022, and titled "Machine-Learned Component for Vehicle Trajectory Generation", as well as in U.S. application Ser. No. 18/072,015, filed Nov. 30, 2022, and titled "Vehicle Trajectory Tree Search for Off-Route Driving Maneuvers" the contents of which are herein incorporated by reference in their entirety and for all purposes. Example techniques for generating a tree structure and determining a control trajectory based on the tree structure can be found, for example, in U.S. application Ser. No. 17/900,658, filed Aug. 21, 2022, and titled "Trajectory Prediction Based on a Decision Tree", the contents of which is herein incorporated by reference in its entirety and for all purposes. Example techniques for using one or more machine-learning models may be used to output a diverse set of candidate trajectories can be found, for example, in U.S. application Ser. No. 18/204,097, filed May 31, 2023, and titled "Vehicle Trajectory Tree Structure including Learned Trajectories", the contents of which is herein incorporated by reference in its entirety and for all purposes. Additionally, or alternatively, the received data may comprise, for example, remote operator-provided references, GOR references, etc.

At 508, the planning component may determine costs for the candidate trajectories based at least on the lane ending costs. Operation 508 may be performed as discussed above with respect to FIGS. 1-4. As discussed above, some examples may include modifying or updating the lane ending costs based on traffic. In some examples, 50 may include operations to update lane ending costs.

At 510, the planning component may determine a control trajectory for the vehicle based at least on the costs determined for the candidate trajectories using the lane ending costs. Then, at 512, the planning component may control the vehicle based on the control trajectory. Following 512, the process may return to 502 for additional operations.

Figure 6:
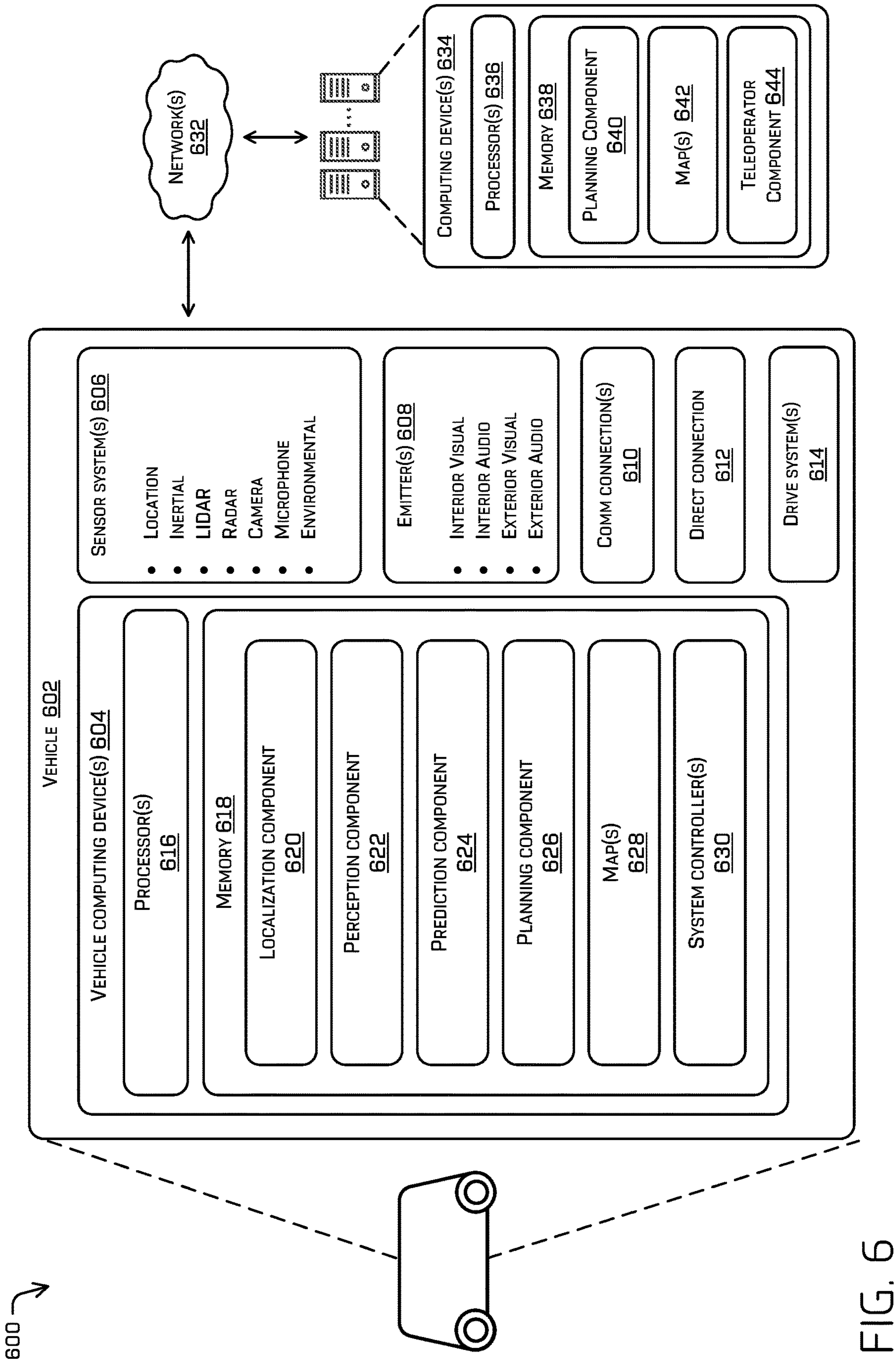
FIG. 6 depicts a block diagram of an example system for implementing various techniques described herein.

FIG. 6 is a block diagram of an example system 600 for implementing the techniques described herein. In at least one example, the system 600 may include a vehicle, such as vehicle 602. The vehicle 602 may include one or more vehicle computing devices 604, one or more sensor systems 606, one or more emitters 608, one or more communication connections 610, at least one direct connection 612, and one or more drive systems 614.

The vehicle computing device 604 may include one or more processors 616 and memory 618 communicatively coupled with the processor(s) 616. In the illustrated example, the vehicle 602 is an autonomous vehicle; however, the vehicle 602 could be any other type of vehicle, such as a semi-autonomous vehicle, or any other system having at least an image capture device (e.g., a camera-enabled smartphone). In some instances, the autonomous vehicle 602 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the autonomous vehicle 602 may be a fully or partially autonomous vehicle having any other level or classification.

In the illustrated example, the memory 618 of the vehicle computing device 604 stores a localization component 620, a perception component 622, a prediction component 624, a planning component 626, one or more system controllers 630, and one or more maps 628 (or map data). Though depicted in FIG. 6 as residing in the memory 618 for illustrative purposes, it is contemplated that the localization component 620, the perception component 622, the prediction component 624, the planning component 626, system controller(s) 630, and/or the map(s) may additionally, or alternatively, be accessible to the vehicle 602 (e.g., stored on, or otherwise accessible by, memory remote from the vehicle 602, such as, for example, on memory 638 of one or more computing device 634 (e.g., a remote computing device)). In some examples, the memory 638 may include a planning component 640, maps 642 (or map data), and a teleoperator component 644.

In at least one example, the localization component 620 may include functionality to receive sensor data from the sensor system(s) 606 to determine a position and/or orientation of the vehicle 602 (e.g., one or more of an x-, y-, z-position, roll, pitch, or yaw). For example, the localization component 620 may include and/or request/receive a map of an environment, such as from map(s) 628, and may continuously determine a location and/or orientation of the vehicle 602 within the environment. In some instances, the localization component 620 may utilize SLAM (simultaneous localization and mapping), CLAMS (calibration, localization and mapping, simultaneously), relative SLAM, bundle adjustment, non-linear least squares optimization, or the like to receive image data, lidar data, radar data, inertial measurement unit (IMU) data, GPS data, wheel encoder data, and the like to accurately determine a location of the vehicle 602. In some instances, the localization component 620 may provide data to various components of the vehicle 602 to determine an initial position of the vehicle 602 for determining the relevance of an object to the vehicle 602, as discussed herein.

In some instances, the perception component 622 may include functionality to perform object detection, segmentation, and/or classification. In some examples, the perception component 622 may provide processed sensor data that indicates a presence of an object (e.g., entity) that is proximate to the vehicle 602 and/or a classification of the object as an object type (e.g., car, pedestrian, cyclist, animal, building, tree, road surface, curb, sidewalk, unknown, etc.). In some examples, the perception component 622 may provide processed sensor data that indicates a presence of a stationary entity that is proximate to the vehicle 602 and/or a classification of the stationary entity as a type (e.g., building, tree, road surface, curb, sidewalk, unknown, etc.). In additional or alternative examples, the perception component 622 may provide processed sensor data that indicates one or more features associated with a detected object (e.g., a tracked object) and/or the environment in which the object is positioned. In some examples, features associated with an object may include, but are not limited to, an x-position (global and/or local position), a y-position (global and/or local position), a z-position (global and/or local position), an orientation (e.g., a roll, pitch, yaw), an object type (e.g., a classification), a velocity of the object, an acceleration of the object, an extent of the object (size), etc. Features associated with the environment may include, but are not limited to, a presence of another object in the environment, a state of another object in the environment, a time of day, a day of a week, a season, a weather condition, an indication of darkness/light, etc.

The prediction component 624 may generate one or more probability maps representing prediction probabilities of possible locations of one or more objects in an environment. For example, the prediction component 624 may generate one or more probability maps for vehicles, pedestrians, animals, and the like within a threshold distance from the vehicle 602. In some instances, the prediction component 624 may measure a track of an object and generate a discretized prediction probability map, a heat map, a probability distribution, a discretized probability distribution, and/or a trajectory for the object based on observed and predicted behavior. In some instances, the one or more probability maps may represent an intent of the one or more objects in the environment.

In some examples, the prediction component 624 may generate predicted trajectories of objects (e.g., objects) in an environment. For example, the prediction component 624 may generate one or more predicted trajectories for objects within a threshold distance from the vehicle 602. In some examples, the prediction component 624 may measure a trace of an object and generate a trajectory for the object based on observed and predicted behavior.

In general, the planning component 626 may determine a path for the vehicle 602 to follow to traverse through an environment. For example, the planning component 626 may determine various routes and trajectories and various levels of detail. For example, the planning component 626 may determine a route to travel from a first location (e.g., a current location) to a second location (e.g., a target location).

For the purpose of this discussion, a route may include a sequence of waypoints for travelling between two locations. As non-limiting examples, waypoints include streets, intersections, global positioning system (GPS) coordinates, etc. Further, the planning component 626 may generate an instruction for guiding the vehicle 602 along at least a portion of the route from the first location to the second location. In at least one example, the planning component 626 may determine how to guide the vehicle 602 from a first waypoint in the sequence of waypoints to a second waypoint in the sequence of waypoints. In some examples, the instruction may be a candidate trajectory, or a portion of a trajectory. In some examples, multiple trajectories may be substantially simultaneously generated (e.g., within technical tolerances) in accordance with a receding horizon technique. A single path of the multiple paths in a receding data horizon having the highest confidence level may be selected to operate the vehicle. In various examples, the planning component 626 may select a trajectory for the vehicle 602.

In other examples, the planning component 626 may alternatively, or additionally, use data from the localization component 620, the perception component 622, and/or the prediction component 624 to determine a path for the vehicle 602 to follow to traverse through an environment. For example, the planning component 626 may receive data (e.g., object data) from the localization component 620, the perception component 622, and/or the prediction component 624 regarding objects associated with an environment. In some examples, the planning component 626 receives data for relevant objects within the environment. Using this data, the planning component 626 may determine a route to travel from a first location (e.g., a current location) to a second location (e.g., a target location) to avoid objects in an environment. In at least some examples, such a planning component 626 may determine there is no such collision-free path and, in turn, provide a path that brings vehicle 602 to a safe stop avoiding all collisions and/or otherwise mitigating damage.

The planning component 626 may also perform any of the techniques described with respect to any of FIGS. 1-5 above with respect to determining lane ending costs, determining costs of vehicle positions or candidate trajectories using the lane ending costs and/or determining a control trajectory based on the costs of the vehicle positions or candidate trajectories.

In at least one example, the vehicle computing device 604 may include one or more system controllers 630, which may be configured to control steering, propulsion, braking, safety, emitters, communication, and other systems of the vehicle 602. The system controller(s) 630 may communicate with and/or control corresponding systems of the drive system(s) 614 and/or other components of the vehicle 602.

The memory 618 may further include one or more maps 628 that may be used by the vehicle 602 to navigate within the environment. For the purpose of this discussion, a map may be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map may include, but is not limited to: texture information (e.g., color information (e.g., RGB color information, Lab color information, HSV/HSL color information), and the like), intensity information (e.g., lidar information, radar information, and the like); spatial information (e.g., image data projected onto a mesh, individual "surfels" (e.g., polygons associated with individual color and/or intensity)), reflectivity information (e.g., specularity information, retroreflectivity information, BRDF information, BSSRDF information, and the like). In one example, a map may include a three-dimensional mesh of the environment. In some examples, the vehicle 602 may be controlled based at least in part on the map(s) 628. That is, the map(s) 628 may be used in connection with the localization component 620, the perception component 622, the prediction component 624, and/or the planning component 626 to determine a location of the vehicle 602, detect objects in an environment, generate routes, determine actions and/or trajectories to navigate within an environment.

In some examples, the one or more maps 628 may be stored as maps 642 on a remote computing device(s) (such as the computing device(s) 634) accessible via network(s) 632. In some examples, multiple maps 628 may be stored based on, for example, a characteristic (e.g., type of entity, time of day, day of week, season of the year, etc.). Storing multiple maps 628 may have similar memory requirements, but increase the speed at which data in a map may be accessed.

In some instances, aspects of some or all of the components discussed herein may include any models, techniques, and/or machine-learned techniques. For example, in some instances, the components in the memory 618 (and the memory 638, discussed below) may be implemented as a neural network.

As described herein, an exemplary neural network is a technique which passes input data through a series of connected layers to produce an output. Each layer in a neural network may also comprise another neural network, or may comprise any number of layers (whether convolutional or not). As may be understood in the context of this disclosure, a neural network may utilize machine learning, which may refer to a broad class of such techniques in which an output is generated based on learned parameters.

Although discussed in the context of neural networks, any type of machine learning may be used consistent with this disclosure. For example, machine learning techniques may include, but are not limited to, regression techniques (e.g., ordinary least squares regression (OLSR), linear regression, logistic regression, stepwise regression, multivariate adaptive regression splines (MARS), locally estimated scatterplot smoothing (LOESS)), instance-based techniques (e.g., ridge regression, least absolute shrinkage and selection operator (LASSO), elastic net, least-angle regression (LARS)), decisions tree techniques (e.g., classification and regression tree (CART), iterative dichotomiser 3 (ID3), Chi-squared automatic interaction detection (CHAID), decision stump, conditional decision trees), Bayesian techniques (e.g., naïve Bayes, Gaussian naïve Bayes, multinomial naïve Bayes, average one-dependence estimators (AODE), Bayesian belief network (BNN), Bayesian networks), clustering techniques (e.g., k-means, k-medians, expectation maximization (EM), hierarchical clustering), association rule learning techniques (e.g., perceptron, back-propagation, hopfield network, Radial Basis Function Network (RBFN)), deep learning techniques (e.g., Deep Boltzmann Machine (DBM), Deep Belief Networks (DBN), Convolutional Neural Network (CNN), Stacked Auto-Encoders), Dimensionality Reduction Techniques (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Techniques (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc.

Additional examples of architectures include neural networks such as ResNet-50, ResNet-101, VGG, DenseNet, PointNet, Xception, ConvNeXt, and the like; visual transformer(s) (ViT(s)), such as a bidirectional encoder from image transformers (BEiT), visual bidirectional encoder from transformers (VisualBERT), image generative pretrained transformer (Image GPT), data-efficient image transformers (DeiT), deeper vision transformer (DeepViT), convolutional vision transformer (CvT), detection transformer (DETR), Miti-DETR, or the like; and/or general or natural language processing transformers, such as BERT, GPT, GPT-2, GPT-3, or the like. In some examples, the ML model discussed herein may comprise PointPillars, SECOND, top-down feature layers (e.g., see U.S. patent application Ser. No. 15/963,833, which is incorporated by reference in its entirety herein for all purposes), and/or VoxelNet. Architecture latency optimizations may include MobilenetV2, Shufflenet, Channelnet, Peleenet, and/or the like. The ML model may comprise a residual block such as Pixor, in some examples.

In at least one example, the sensor system(s) 606 may include lidar sensors, radar sensors, ultrasonic transducers, sonar sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, time of flight, etc.), microphones, wheel encoders, environment sensors (e.g., temperature sensors, humidity sensors, light sensors, pressure sensors, etc.), etc. The sensor system(s) 606 may include multiple instances of each of these or other types of sensors. For instance, the lidar sensors may include individual lidar sensors located at the corners, front, back, sides, and/or top of the vehicle 602. As another example, the camera sensors may include multiple cameras disposed at various locations about the exterior and/or interior of the vehicle 602. The sensor system(s) 606 may provide input to the vehicle computing device 604. Additionally, or in the alternative, the sensor system(s) 606 may send sensor data, via the one or more networks 632, to the one or more computing device(s) 634 at a particular frequency, after a lapse of a predetermined period of time, in near real-time, etc.

The vehicle 602 may also include one or more emitters 608 for emitting light and/or sound. The emitter(s) 608 may include interior audio and visual emitters to communicate with passengers of the vehicle 602. By way of example and not limitation, interior emitters may include speakers, lights, signs, display screens, touch screens, haptic emitters (e.g., vibration and/or force feedback), mechanical actuators (e.g., seatbelt tensioners, seat positioners, headrest positioners, etc.), and the like. The emitter(s) 608 may also include exterior emitters. By way of example and not limitation, the exterior emitters may include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which comprising acoustic beam steering technology.

The vehicle 602 may also include one or more communication connections 610 that enable communication between the vehicle 602 and one or more other local or remote computing device(s). For instance, the communication connection(s) 610 may facilitate communication with other local computing device(s) on the vehicle 602 and/or the drive system(s) 614. Also, the communication connection(s) 610 may allow the vehicle to communicate with other nearby computing device(s) (e.g., computing device 634, other nearby vehicles, etc.) and/or one or more remote sensor system(s) for receiving sensor data. The communications connection(s) 610 also enable the vehicle 602 to communicate with a remote teleoperations computing device or other remote services.

The communications connection(s) 610 may include physical and/or logical interfaces for connecting the vehicle computing device 604 to another computing device or a network, such as network(s) 632. For example, the communications connection(s) 610 may enable Wi-Fi-based communication such as via frequencies defined by the IEEE 802.11 standards, short range wireless frequencies such as Bluetooth, cellular communication (e.g., 2G, 3G, 4G, 4G LTE, 5G, etc.) or any suitable wired or wireless communications protocol that enables the respective computing device to interface with the other computing device(s).

In at least one example, the vehicle 602 may include one or more drive systems 614. In some examples, the vehicle 602 may have a single drive system 614. In at least one example, if the vehicle 602 has multiple drive systems 614, individual drive systems 614 may be positioned on opposite ends of the vehicle 602 (e.g., the front and the rear, etc.). In at least one example, the drive system(s) 614 may include one or more sensor systems to detect conditions of the drive system(s) 614 and/or the surroundings of the vehicle 602. By way of example and not limitation, the sensor system(s) may include one or more wheel encoders (e.g., rotary encoders) to sense rotation of the wheels of the drive modules, inertial sensors (e.g., inertial measurement units, accelerometers, gyroscopes, magnetometers, etc.) to measure orientation and acceleration of the drive module, cameras or other image sensors, ultrasonic sensors to acoustically detect objects in the surroundings of the drive module, lidar sensors, radar sensors, etc. Some sensors, such as the wheel encoders may be unique to the drive system(s) 614. In some cases, the sensor system(s) on the drive system(s) 614 may overlap or supplement corresponding systems of the vehicle 602 (e.g., sensor system(s) 606).

The drive system(s) 614 may include many of the vehicle systems, including a high voltage battery, a motor to propel the vehicle, an inverter to convert direct current from the battery into alternating current for use by other vehicle systems, a steering system including a steering motor and steering rack (which may be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 614 may include a drive module controller which may receive and preprocess data from the sensor system(s) and to control operation of the various vehicle systems. In some examples, the drive module controller may include one or more processors and memory communicatively coupled with the one or more processors. The memory may store one or more modules to perform various functionalities of the drive system(s) 614. Furthermore, the drive system(s) 614 may also include one or more communication connection(s) that enable communication by the respective drive module with one or more other local or remote computing device(s).

In at least one example, the direct connection 612 may provide a physical interface to couple the one or more drive system(s) 614 with the body of the vehicle 602. For example, the direct connection 612 may allow the transfer of energy, fluids, air, data, etc. between the drive system(s) 614 and the vehicle. In some instances, the direct connection 612 may further releasably secure the drive system(s) 614 to the body of the vehicle 602.

In at least one example, the localization component 620, the perception component 622, the prediction component 624, the planning component 626, the one or more system controllers 630, and the one or more maps 628 may process sensor data, as described above, and may send their respective outputs, over the one or more network(s) 632, to the computing device(s) 634. In at least one example, the localization component 620, the perception component 622, the prediction component 624, the planning component 626, the one or more system controllers 630, and the one or more maps 628 may send their respective outputs to the computing device(s) 634 at a particular frequency, after a lapse of a predetermined period of time, in near real-time, etc.

In some examples, the vehicle 602 may send sensor data to the computing device(s) 634 via the network(s) 632. In some examples, the vehicle 602 may receive sensor data from the computing device(s) 634 and/or remote sensor system(s) via the network(s) 632. The sensor data may include raw sensor data and/or processed sensor data and/or representations of sensor data. In some examples, the sensor data (raw or processed) may be sent and/or received as one or more log files.

The computing device(s) 634 may include processor(s) 636 and a memory 638, which may a planning component 640, a maps 642, and a teleoperator component 644. In some examples, the memory 638 may store one or more of components that are similar to the component(s) stored in the memory 618 of the vehicle 602. In such examples, the computing device(s) 634 may be configured to perform one or more of the processes described herein with respect to the vehicle 602. In some examples, the planning component 640 and the maps 642 may perform substantially similar functions as the planning component 626 and maps 628. In some examples, the teleoperator component 644 may provide an interface for a teleoperator to provide control inputs to the vehicle 602 (e.g., teleoperator reference data or teleoperator route references such as teleoperator reference 136).

The processor(s) 616 of the vehicle 602 and the processor(s) 636 of the computing device(s) 634 may be any suitable processor capable of executing instructions to process data and perform operations as described herein. By way of example and not limitation, the processor(s) may comprise one or more Central Processing Units (CPUs), Graphics Processing Units (GPUs), or any other device or portion of a device that processes electronic data to transform that electronic data into other electronic data that may be stored in registers and/or memory. In some examples, integrated circuits (e.g., ASICs, etc.), gate arrays (e.g., FPGAs, etc.), and other hardware devices may also be considered processors in so far as they are configured to implement encoded instructions.

Memory 618 and memory 638 are examples of non-transitory computer-readable media. The memory 618 and memory 638 may store an operating system and one or more software applications, instructions, programs, and/or data to implement the methods described herein and to cause the functions and operations attributed to the various systems to be performed. In various implementations, the memory may be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein.

It should be noted that while FIG. 6 is illustrated as a distributed system, in alternative examples, components of the vehicle 602 may be associated with the computing device(s) 634 and/or components of the computing device(s) 634 may be associated with the vehicle 602. That is, the vehicle 602 may perform one or more of the functions associated with the computing device(s) 634, and vice versa.

The methods described herein represent sequences of operations that may be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations may be combined in any order and/or in parallel to implement the processes. In some examples, one or more operations of the method may be omitted entirely. For instance, the operations may include determining lane ending costs without determining a costs for vehicle positions based thereon. Moreover, the methods described herein may be combined in whole or in part with each other or with other methods.

The various techniques described herein may be implemented in the context of computer-executable instructions or software, such as program modules, that are stored in computer-readable storage and executed by the processor(s) of one or more computing devices such as those illustrated in the figures. Generally, program modules include routines, programs, objects, components, data structures, etc., and define operating logic for performing particular tasks or implement particular abstract data types.

Other architectures may be used to implement the described functionality and are intended to be within the scope of this disclosure. Furthermore, although specific distributions of responsibilities are defined above for purposes of discussion, the various functions and responsibilities might be distributed and divided in different ways, depending on circumstances.

Similarly, software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

Example Clauses

A. A system comprising: one or more processors; and one or more non-transitory computer-readable media storing computer-executable instructions that, when executed, cause the one or more processors to perform operations comprising: receiving a route for an autonomous vehicle to traverse through an environment, the route associated with a plurality of lanes; determining, as a lane ending for a lane of the plurality of lanes and based at least in part on a desired endpoint, a position along the lane where the autonomous vehicle is unable to follow the lane to arrive at the desired endpoint; determining, based at least in part on the lane ending, a lane ending cost associated with a portion of the lane, wherein the lane ending cost increases a cost of driving in the lane; determining a cost for a candidate trajectory based at least in part on the lane ending cost; determining a control trajectory for the autonomous vehicle, based at least in part on the cost for the candidate trajectory; and controlling the autonomous vehicle based at least in part on the control trajectory.

B. The system of clause A, wherein the lane is a first lane associated with a first lane ending cost; a second lane of the route is between the first lane and a lane that arrives at the desired endpoint, the second lane having a second lane ending; the second lane of the route is associated with a second lane ending cost; and based at least in part on a relative position of the plurality of lanes, the first lane ending cost is determined to be greater than the second lane ending cost.

C. The system of clause A, wherein determining the lane ending cost is further based at least in part on traffic information or obstacles in the environment associated with the lane.

D. The system of clause A, the operations further comprise: determining a queue of vehicles associated with the desired endpoint; and modifying the lane ending cost based at least in part on a distance from the lane ending of the lane to a vehicle in the queue.

E. The system of clause A, the operations further comprise: detecting a vehicle in the lane arriving at the desired endpoint; determining a distance from a position of the autonomous vehicle to the vehicle; determining a speed of the vehicle; determining a lane change uncertainty modifier based at least partly on one or more of the distance or the speed; and modifying the lane ending cost based at least in part on the lane change uncertainty modifier.

F. One or more non-transitory computer-readable media storing instructions executable by one or more processors, wherein the instructions, when executed, cause the one or more processors to perform operations comprising: determining a lane ending of a lane of a route, the lane ending indicative of whether a vehicle is able to continue along the lane to a desired endpoint of the route; determining, based at least in part on the lane ending, a lane ending cost; determining a cost for a candidate trajectory based at least in part on the lane ending cost; and determining a control trajectory for an autonomous vehicle based at least in part on the cost for the candidate trajectory.

G. The one or more non-transitory computer-readable media of clause F, wherein: the lane is a first lane associated with a first lane ending cost; a second lane of the route is between the first lane and a lane that arrives at the desired endpoint, the second lane having a second lane ending; the second lane of the route is associated with a second lane ending cost; and based at least in part on a relative position of the first lane, the second lane and the lane that arrives at the desired endpoint, the first lane ending cost is determined to be greater than the second lane ending cost.

H. The one or more non-transitory computer-readable media of clause F, wherein determining the lane ending cost is further based at least in part on a distance from a position associated with the lane ending cost to the lane ending.

I. The one or more non-transitory computer-readable media of clause F, wherein determining the lane ending cost is based at least in part on traffic information or obstacles in an environment of the autonomous vehicle.

J. The one or more non-transitory computer-readable media of clause F, wherein the operations further comprise: detecting a vehicle in a lane that continues to the desired endpoint; and modifying the lane ending cost based at least in part on a distance from the vehicle to the autonomous vehicle.

K. The one or more non-transitory computer-readable media of clause F, wherein the operations further comprises: detecting a vehicle in the lane that continues to the desired endpoint; determining a distance from a position of the autonomous vehicle position to the vehicle; determining a respective speed of the vehicle; determining a lane change uncertainty modifier based at least partly on one or more of the distance or the speed; and modifying the lane ending cost based at least in part on the lane change uncertainty modifier.

L. The one or more non-transitory computer-readable media of clause F, wherein: a continuing lane comprises a lane which reaches the desired endpoint; and the lane ending cost increases a cost of driving in the lane with respect to driving in the continuing lane.

M. The one or more non-transitory computer-readable media of clause F, wherein the operations further comprise: controlling the autonomous vehicle based at least in part on the control trajectory.

N. A method comprising: determining a lane ending of a lane of a route, the lane ending indicative of whether a vehicle is able to continue along the lane to a desired endpoint of the route; determining, based at least in part on the lane ending, a lane ending cost; determining a cost for a candidate trajectory based at least in part on the lane ending cost; and determining a control trajectory for an autonomous vehicle, based at least in part on the cost for the candidate trajectory.

O. The method of clause N, wherein: the lane is a first lane associated with a first lane ending cost; a second lane of the route is between the first lane and a lane that arrives at the desired endpoint, the second lane having a second lane ending; the second lane of the route is associated with a second lane ending cost; and based at least in part on a relative position of the first lane, the second lane and the lane that arrives at the desired endpoint, the first lane ending cost is determined to be greater than the second lane ending cost.

P. The method of clause N, wherein determining the lane ending cost is further based at least in part on a distance from a position associated with the lane ending cost to the lane ending.

Q. The method of clause N, further comprising: detecting a vehicle in a lane that continues to the desired endpoint; and modifying the lane ending cost based at least in part on a distance from the vehicle to the autonomous vehicle.

R. The method of clause N, further comprising: detecting a vehicle in a lane that continues to the desired endpoint; determining a distance from a position of the autonomous vehicle to the vehicle; determining a respective speed of the vehicle; determining a lane change uncertainty modifier based at least partly on one or more of the distance or the respective speed; and modifying the lane ending cost based at least in part on the lane change uncertainty modifier.

S. The method of clause N, wherein: a continuing lane comprises a lane which reaches the desired endpoint; and the lane ending cost increases a cost of driving in the lane with respect to driving in the continuing lane.

T. The method of clause N, further comprising: controlling the autonomous vehicle based at least in part on the control trajectory.

While the example clauses described above are described with respect to particular implementations, it should be understood that, in the context of this document, the content of the example clauses can be implemented via a method, device, system, a computer-readable medium, and/or another implementation. Additionally, any of examples A-T may be implemented alone or in combination with any other one or more of the examples A-T.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples may be used and that changes or alterations, such as structural changes, may be made. Such examples, changes or alterations are not necessarily departures from the scope with respect to the intended claimed subject matter. While the steps herein may be presented in a certain order, in some cases the ordering may be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The components described herein represent instructions that may be stored in any type of computer-readable medium and may be implemented in software and/or hardware. All of the methods and processes described above may be embodied in, and fully automated via, software code modules and/or computer-executable instructions executed by one or more computers or processors, hardware, or some combination thereof. Some or all of the methods may alternatively be embodied in specialized computer hardware.

Conditional language such as, among others, "may," "could," "may" or "might," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example.

Conjunctive language such as the phrase "at least one of X, Y or Z," unless specifically stated otherwise, is to be understood to present that an item, term, etc. may be either X, Y, or Z, or any combination thereof, including multiples of each element. Unless explicitly described as singular, "a" means singular and plural.

Any routine descriptions, elements or blocks in the flow diagrams described herein and/or depicted in the attached figures should be understood as potentially representing modules, segments, or portions of code that include one or more computer-executable instructions for implementing specific logical functions or elements in the routine. Alternate implementations are included within the scope of the examples described herein in which elements or functions may be deleted, or executed out of order from that shown or discussed, including substantially synchronously, in reverse order, with additional operations, or omitting operations, depending on the functionality involved as would be understood by those skilled in the art.

Many variations and modifications may be made to the above-described examples, the elements of which are to be understood as being among other acceptable examples. All such modifications and variations are intended to be included herein within the scope of this disclosure and protected by the following claims.

What is claimed is:

1. A system comprising:

one or more processors; and one or more non-transitory computer-readable media storing computer-executable instructions that, when executed, cause the one or more processors to perform operations comprising:

receiving a route for an autonomous vehicle to traverse through an environment, the route associated with a plurality of lanes;

determining, as a lane ending for a first lane of the plurality of lanes and based at least in part on a desired endpoint, a position along the first lane where the autonomous vehicle is unable to follow the first lane to arrive at the desired endpoint, wherein the lane ending is located between a current position of the autonomous vehicle and a segment of the first lane that is beyond a region in which the first lane diverges from a second lane, the second lane being one of a set of lanes upon which the autonomous vehicle is able to traverse to the desired endpoint;

determining, based at least in part on the lane ending, a lane ending cost associated with a portion of the first lane, wherein the lane ending cost increases a cost of driving in the first lane;

determining a cost for a candidate trajectory based at least in part on the lane ending cost;

determining a control trajectory for the autonomous vehicle, based at least in part on the cost for the candidate trajectory; and controlling steering, propulsion, or braking of the autonomous vehicle based at least in part on the control trajectory.

2. The system of claim 1, wherein:

the first lane is associated with a first lane ending cost;

a second lane of the route is between the first lane and the lane arriving at the desired endpoint, the second lane having a second lane ending;

the second lane of the route is associated with a second lane ending cost; and based at least in part on a relative position of the plurality of lanes, the first lane ending cost is determined to be greater than the second lane ending cost.

3. The system of claim 1, wherein determining the lane ending cost is further based at least in part on traffic information or obstacles in the environment associated with the first lane.

4. The system of claim 1, the operations further comprise:

determining a queue of vehicles associated with the desired endpoint; and modifying the lane ending cost based at least in part on a distance from the lane ending of the first lane to a vehicle in the queue.

5. The system of claim 1, the operations further comprise:

detecting a vehicle in the lane arriving at the desired endpoint;

determining a distance from a position of the autonomous vehicle to the detected vehicle;

determining a speed of the detected vehicle;

determining a lane change uncertainty modifier based at least partly on one or more of the distance or the speed; and modifying the lane ending cost based at least in part on the lane change uncertainty modifier.

6. One or more non-transitory computer-readable media storing instructions executable by one or more processors, wherein the instructions, when executed, cause the one or more processors to perform operations comprising:

determining a lane ending of a first lane of a route, the lane ending indicative of whether a vehicle is able to continue along the first lane to a desired endpoint of the route, wherein the vehicle is unable to follow the first lane to the desired endpoint, and the lane ending is located at or beyond a point along the first lane where the first lane diverges from a second lane proximate the first lane;

determining, based at least in part on the lane ending, a lane ending cost;

determining a cost for a candidate trajectory based at least in part on the lane ending cost;

determining a control trajectory for the vehicle based at least in part on the cost for the candidate trajectory; and controlling steering, propulsion, or braking of the vehicle based at least in part on the control trajectory.

7. The one or more non-transitory computer-readable media of claim 6, wherein:

the first lane is associated with a first lane ending cost;

a second lane of the route is between the first lane and the lane arriving at the desired endpoint, the second lane having a second lane ending;

the second lane of the route is associated with a second lane ending cost; and based at least in part on a relative position of the first lane, the second lane and the lane arriving at the desired endpoint, the first lane ending cost is determined to be greater than the second lane ending cost.

8. The one or more non-transitory computer-readable media of claim 6, wherein determining the lane ending cost is further based at least in part on a distance from a position associated with the lane ending cost to the lane ending.

9. The one or more non-transitory computer-readable media of claim 6, wherein determining the lane ending cost is based at least in part on traffic information or obstacles in an environment of the vehicle.

10. The one or more non-transitory computer-readable media of claim 6, wherein the operations further comprise:

detecting a second vehicle in the lane arriving at the desired endpoint; and modifying the lane ending cost based at least in part on a distance from the second vehicle to the vehicle.

11. The one or more non-transitory computer-readable media of claim 6, wherein the operations further comprises:

detecting a second vehicle in the lane arriving at the desired endpoint;

determining a distance from a position of the vehicle position to the detected vehicle;

determining a respective speed of the second vehicle;

determining a lane change uncertainty modifier based at least partly on one or more of the distance or the speed; and modifying the lane ending cost based at least in part on the lane change uncertainty modifier.

12. The one or more non-transitory computer-readable media of claim 6, wherein:

a continuing lane comprises a lane which reaches the desired endpoint; and the lane ending cost increases a cost of driving in the first lane with respect to driving in the continuing lane.

13. A method comprising:

determining a lane ending of a first lane of a route, the lane ending indicative of whether a vehicle is able to continue along the first lane to a desired endpoint of the route, wherein the vehicle is unable to follow the first lane to the desired endpoint, and the lane ending is located between at a position along the first lane at or beyond where the first lane diverges from an adjacent lane;

determining, based at least in part on the lane ending, a lane ending cost;

determining a cost for a candidate trajectory based at least in part on the lane ending cost;

determining a control trajectory for the vehicle, based at least in part on the cost for the candidate trajectory; and controlling steering, propulsion, or braking of the vehicle based at least in part on the control trajectory.

14. The method of claim 13, wherein:

the first lane is associated with a first lane ending cost;

a second lane of the route is between the first lane and the lane arriving at the desired endpoint, the second lane having a second lane ending;

the second lane of the route is associated with a second lane ending cost; and based at least in part on a relative position of the first lane, the second lane and the lane arriving at the desired endpoint, the first lane ending cost is determined to be greater than the second lane ending cost.

15. The method of claim 13, wherein determining the lane ending cost is further based at least in part on a distance from a position associated with the lane ending cost to the lane ending.

16. The method of claim 13, further comprising:

detecting a second vehicle in the lane arriving at the desired endpoint; and modifying the lane ending cost based at least in part on a distance from the second vehicle to the vehicle.

17. The method of claim 13, further comprising:

detecting a second vehicle in the lane arriving at the desired endpoint;

determining a distance from a position of the vehicle to the second vehicle;

determining a respective speed of the second vehicle;

determining a lane change uncertainty modifier based at least partly on one or more of the distance or the respective speed; and modifying the lane ending cost based at least in part on the lane change uncertainty modifier.

18. The method of claim 13, wherein:

a continuing lane comprises a lane which reaches the desired endpoint; and the lane ending cost increases a cost of driving in the first lane with respect to driving in the continuing lane.

* * * * *